United States Patent [19]
Stanesic et al.

[11] Patent Number: 5,823,601
[45] Date of Patent: Oct. 20, 1998

[54] PLASTIC BED RAIL COVER WITH INTEGRATED FASTENING SYSTEM

[75] Inventors: John M. Stanesic, Longmont, Colo.; Scott P. Thompson, Des Moines, Iowa

[73] Assignee: DFM Corporation, Indianola, Iowa

[21] Appl. No.: 778,310

[22] Filed: Jan. 2, 1997

[51] Int. Cl.[6] .................................................. B60R 13/04
[52] U.S. Cl. ............................. 296/41; 296/43; 280/770
[58] Field of Search ................................... 296/3, 41, 43, 296/37.6, 39.1, 39.2; 280/770; 410/108–110, 112

[56] References Cited

U.S. PATENT DOCUMENTS

| | | | |
|---|---|---|---|
| 4,906,040 | 3/1990 | Edwards | 296/39.2 |
| 4,909,559 | 3/1990 | Zettle | 296/41 |
| 4,958,875 | 9/1990 | Zamzow | 410/110 X |
| 5,326,203 | 7/1994 | Cockrell | 410/110 |
| 5,360,250 | 11/1994 | Wood et al. | 296/43 X |
| 5,513,934 | 5/1996 | German | 296/39.2 X |
| 5,704,678 | 1/1998 | Elwell et al. | 296/41 X |

*Primary Examiner*—Dennis H. Pedder
*Attorney, Agent, or Firm*—Zarley, McKee, Thomte, Voorhees & Sease

[57] ABSTRACT

A bed rail cover for mounting to and protecting a vehicle bed rail. The bed rail cover is comprised of an integrally formed elongated rail cover having a top wall and two opposing side walls that are shaped to substantially conform to the exterior of the bed rail, and a fastening means for securing the rail cover to the bed rail about a stake hole pocket in the bed rail. In a preferred embodiment, a fastening clip having opposing wings is inserted through the rail cover and into a stake hole pocket, the wings being yieldably biased against the stake hole pocket to secure the rail cover in place. The fastening clip allows the rail cover to expand and contract in a longitudinal direction to prevent cracking and bulging of the rail cover.

9 Claims, 3 Drawing Sheets

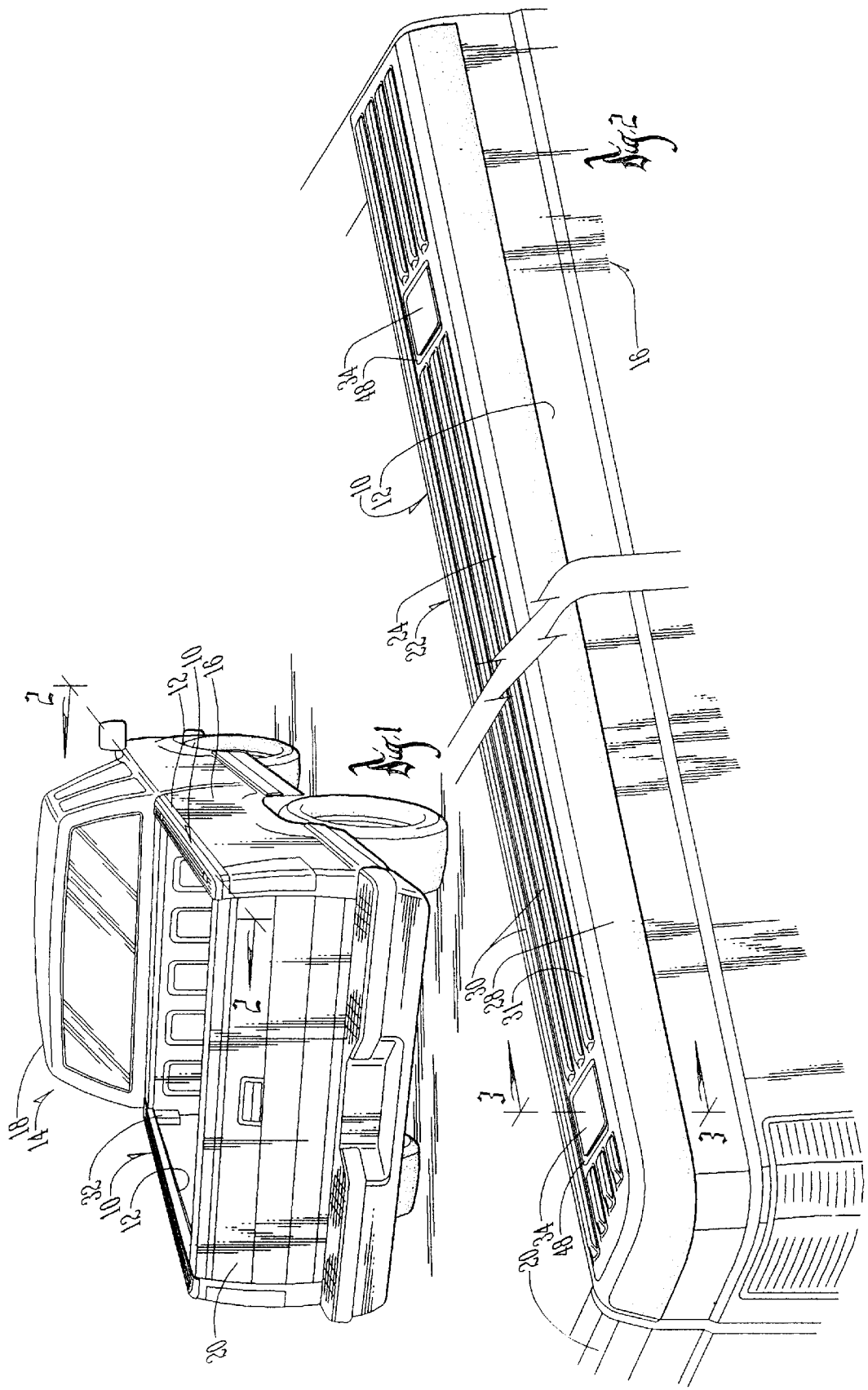

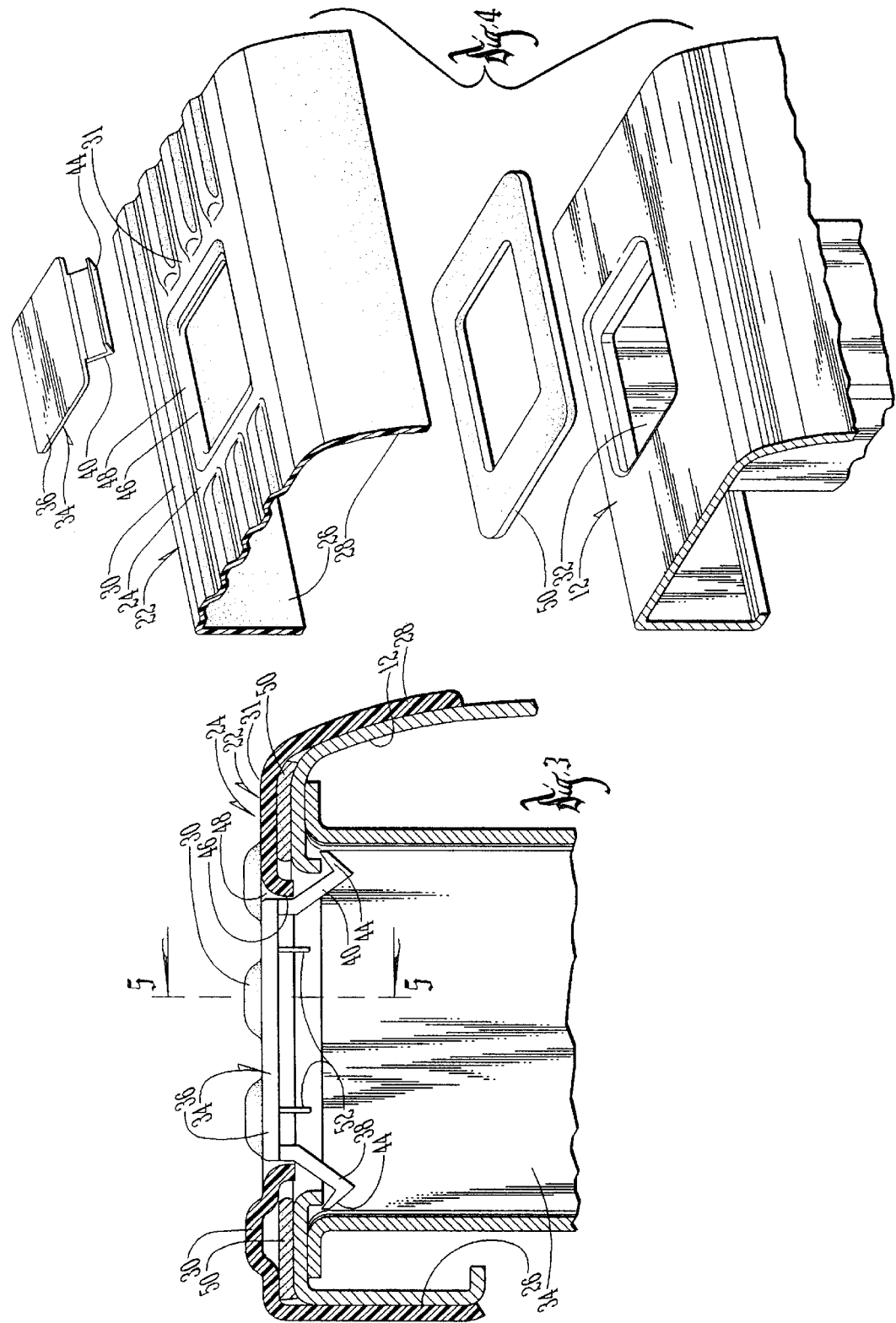

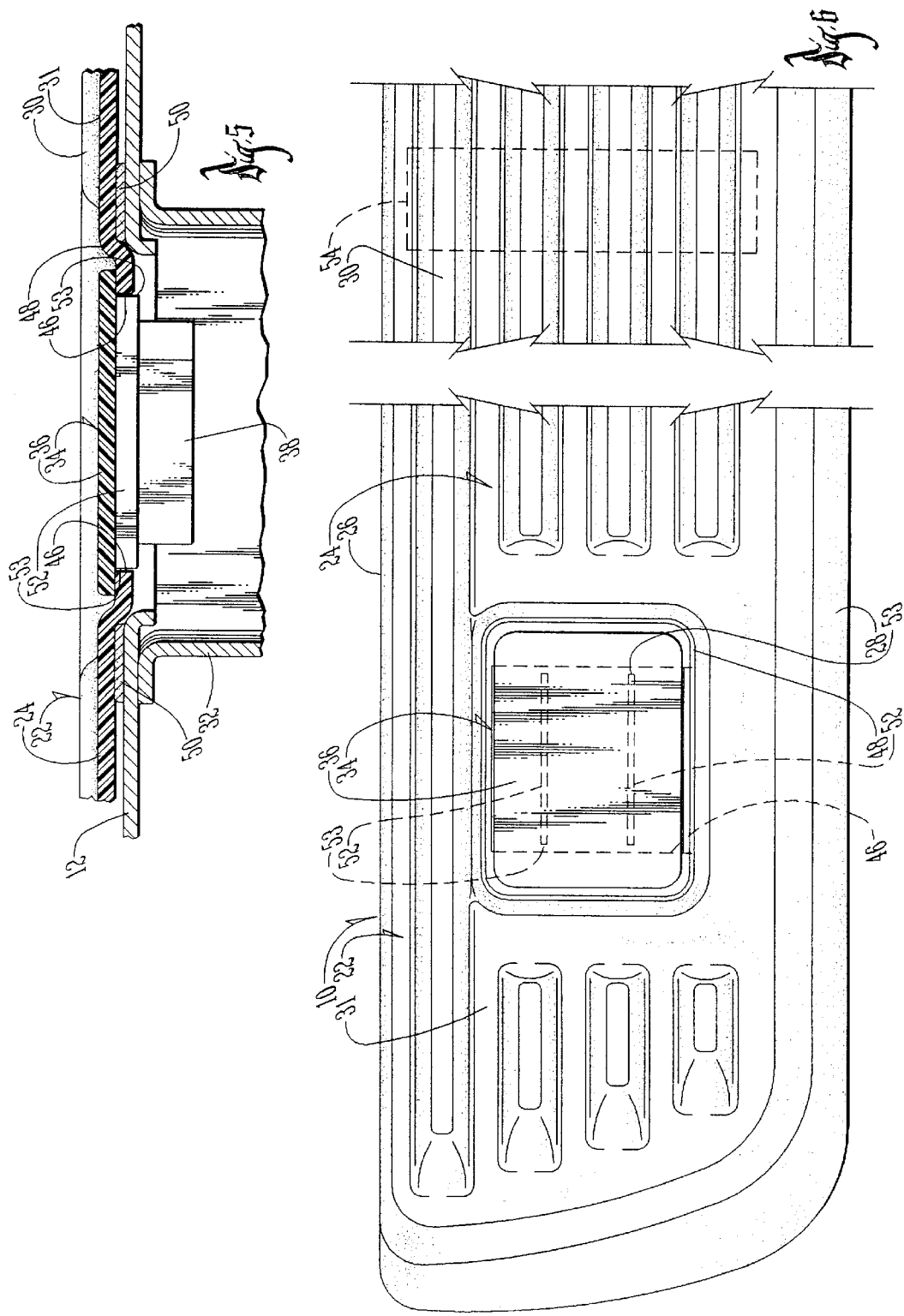

PLASTIC BED RAIL COVER WITH INTEGRATED FASTENING SYSTEM

FIELD OF THE INVENTION

The present invention pertains to a bed rail cover which is mountable to the bed rail of a truck bed.

BACKGROUND OF THE INVENTION

The use of bed rail covers for pickup trucks and other motor vehicles is well known. Such rail covers are currently sold in the vehicle accessory market, often as plastic component kits attachable either by dealers or by the ultimate customers. The primary purpose of such bed rail covers is to protect the paint finish on the bed rails from marring and chipping. Some bed rail covers also enhance the esthetic appeal of the truck bed.

Although prior art bed rail covers have many desirable features, they also have some inherent problems. First, the rail covers are normally attached to the bed rail by inserting a screw or other fastener through the rail cover and into the bed rail. This means of attachment is undesirable because the rail cover is not easily removable and the fastener causes permanent damage to the bed rail. Thus, there is a need in the art for a bed rail cover that does not cause damage to the bed rail and allows the rail cover to be easily removed.

Prior art bed rail covers also do not allow for the expansion and contraction of the rail cover, resulting from changes in temperature. It is not uncommon for a plastic rail cover to expand by as much as a half inch after several hours in the hot sun. The fastening means used by prior art rail covers restricts the amount of expansion that can occur. As a result, the rail cover will crack or bulge to relieve the pressure caused by the expansion. As such, there is also a need in the art for a bed rail cover that allows for expansion and contraction during periods of extreme temperature change.

It can therefore be seen that there is a real and continuing need for the development of an improved, lightweight, economical, easy to install bed rail cover.

The primary objective of the present invention is the provision of an improved bed rail cover which is efficient in operation, economical to manufacture, and durable in use.

Another objective of the present invention is the provision of a bed rail cover that can be easily attached to a bed rail without using conventional fasteners and causing permanent damage to the bed rail.

Still another objective of the present invention is the provision of a bed rail cover that is allowed to expand and contract without causing structural damage to the rail cover.

Another objective of the present invention is the provision of an improved method for installing a bed rail cover.

SUMMARY OF THE INVENTION

The foregoing objectives are achieved in the preferred embodiment of the invention by an integrally formed elongated rail cover having a top wall and two opposing side walls shaped to substantially conform to the exterior of the bed rail, and a fastening means for securing the rail cover to the bed rail about a stake hole pocket in the vehicle bed. In its preferred form, the fastening means includes a fastening clip having opposing wings that are yieldably biased. The fastening clip is inserted through the rail cover and into a stake hole pocket of the truck bed, the wings being yieldably biased against the stake hole pocket to fix the clip and secure the rail cover to the bed rail. Such a fastening means allows the rail cover to be easily removed and does not cause permanent damage to the bed rail.

The wings of the fastening clip are sized to slide against the stake hole pocket about the longitudinal axis of the rail cover. This sliding of the fastening clip facilitates expansion of the rail cover about its longitudinal axis. An adhesive material can be disposed between the rail cover and the vehicle bed, thereby splitting the expansion of the rail cover.

BRIEF DESCRIPTION OF THE DRAWINGS

FIG. 1 is a perspective view of a pickup truck with a bed rail cover embodying the present invention attached.

FIG. 2 is an enlarged partial perspective view of the bed rail and bed rail cover taken along line 2—2 of FIG. 1.

FIG. 3 is a sectional view showing a fastening clip used in the present invention taken along line 3—3 of FIG. 2.

FIG. 4 is a partial exploded perspective view showing the rail cover for attachment with a stake hole pocket.

FIG. 5 is a sectional view taken along line 5—5 of FIG. 3.

FIG. 6 is a partial top elevational view of the bed rail cover.

DETAILED DESCRIPTION OF THE INVENTION

The present invention will be described as it applies to its preferred embodiment. It is not intended that the present invention be limited to the described embodiment. It is intended that the invention cover all alternatives, modifications, and equivalents which may be included within the spirit and scope of the invention.

With continuing reference to the drawings, the bed rail cover 10 may be mounted to a bed rail 12 of a pickup truck 14 or other vehicle as illustrated in FIG. 1. The bed rails 12 reside at the top of each quarter panel 16 of the pickup truck 14, between the vehicle cab 18 and tailgate 20.

As shown most clearly in FIGS. 3 and 4, the bed rail cover 10 of the present invention is comprised of an integrally formed elongated rail cover 22 having a top wall 24 and two opposing side walls 26 and 28. The top wall 24 and the side walls (26, 28) of the rail cover 22 are customized for a specific application to substantially conform to the exterior of the bed rail 12. A plurality of parallel ridges 30 are provided along the top surface 31 of the rail cover 22 about its longitudinal axis to provide traction and improve the esthetic appeal of the rail cover 22. The rail cover 22 is ideally formed of a thermoset plastic.

To fasten the rail cover 22 to the bed rail 12, the present invention takes advantage of the stake hole pockets 32 that reside along each of the bed rails 12. There are generally three stake hole pockets 32, one towards the cab 18, one towards the rear or tail gate 20, and another near the middle of the bed rail 12. The preferred means of fastening the rail cover 22 to the bed rail 12 includes the use of a fastening clip 34 as shown in FIGS. 3–5. The fastening clip 34 generally comprises an upper wall 36 and two opposing wings 38 and 40 extending therefrom. Each of the wings (38, 40) has a single barb 44 and is yieldably biased outwards. The bed rail cover 22 includes a plurality of apertures 44, each aligned with an opening 46 of a stake hole pocket 32. The fastening clip 34 is inserted through the aperture 44 and opening 46 and into the stake hole pocket 32. The wings (38, 40) are yieldably biased against the stake hole pocket 32 to fix the clip 34 in place and secure the rail cover 22 to the bed rail 12. As described above, the fastening means used in the present invention avoids having to drill through the bed rail 12 to fasten the rail cover 22 and cause permanent damage to the bed rail 12. The upper wall 36 of the fastening clip 32 is recessed in the rail cover 22, abutting a recessed portion 48 surrounding each aperture 44.

A flexible elastomeric gasket 50 is also provided. The gasket 50 is disposed between the bed rail 12 and the rail cover 22 and causes the recessed portion 48 of the rail cover to push against the upper wall 36 of the fastening clip 34 to maintain a tight fit and avoid or minimize vibration and shake.

As best shown in FIG. 5, the wings (38, 40) of the fastening clip 34 are sized smaller than the stake hole pocket 32, allowing the fastening clip 34 to slide along the longitudinal axis of the rail cover 22 as the wings (38, 40) slide against the stake hole pocket 32. This, in turn, allows the rail cover 22 to expand in a longitudinal direction without creating excessive amounts of internal stress. Reinforcement rails 52 extend beneath the upper wall 36 of the fastening clip 34. In addition to giving the fastening clip 34 more strength and stability, the reinforcement rails 52 center the fastening clip 34 about the aperture 44 of the rail cover. The ends 53 of the reinforcement rails 52 butt against the recessed portion 48 of the rail cover 22. As a result, when the rail cover expands and contracts, the rail cover 22 and fastening clip 34 move together, not independent of one another.

It is also preferred that a flexible adhesive material, such as an adhesive tape 54, be used to help secure the rail cover 22 to the bed rail 12. It is preferred that the adhesive tape 54 be disposed between the bottom surface 55 of the rail cover 22 and the bed rail 12, about the width of the bed rail. The adhesive tape 54 effectively splits the expansion, allowing the rail cover 22 to expand about its longitudinal axis from the point at which the adhesive tape 54 is attached to the rail cover 22. To minimize the amount of expansion in any one direction, it is preferred that the adhesive tape 54 be positioned towards the center of the rail cover 22 between the vehicle cab 18 and tailgate 20. It should be appreciated that the adhesive tape 54 works together with and compliments the fastening clips 34 to secure the rail cover 22 to the bed rail 12, while still allowing the rail cover to expand about its longitudinal axis during periods of temperature change.

The fastening clip 34 is preferably made of a nylon thermal plastic having a high elasticity and a low coefficient of friction.

The method of installing the bed rail cover 10 of the present invention is simple and easy. First, a strip of flexible adhesive tape 54 is applied to either the bottom surface 55 of the rail cover 22 or directly to the bed rail 12. Next, the rail cover 22 is placed in its mounting position on top of the bed rail 12, with the apertures 44 in the rail cover 22 being aligned with each of the openings 46 of the stake hole pockets 32. Finally, a fastening clip 34 is inserted through the aperture 44 and past the opening 46 of the stake hole pocket 32. The wings (38, 40) of the fastening clip 34 are yieldably biased against the stake hole pocket 32 to fix the clip 34 in place to secure the rail cover 22 to the bed rail 12.

It can therefore be seen that the invention accomplishes at least all of its stated objectives.

What is claimed is:

1. A bed rail cover for mounting to and protecting a vehicle bed rail having a stake hole pocket, comprising:

an integrally formed elongated thermoplastic rail cover having a top wall two opposing side walls and an aperture substantially aligned with said stake hole pocket, said top wall and said side walls being shaped to substantially conform to the exterior of said bed rail; and a one piece fastening clip having an upper wall and two opposing wings extending therefrom, said rail cover being disposed between said fastening clip and said bed rail and said wings being yieldably biased against said stake hole pocket to secure said rail cover to said bed rail;

a length of said wings along a longitudinal axis of said rail cover being sized smaller than a length of said stake hole pocket along the longitudinal axis of said rail cover, whereby said wings being allowed to slide against said stake hole pocket along the longitudinal axis of said rail cover and said rail cover being allowed to freely contract and expand about its longitudinal axis.

2. The bed rail cover of claim 1 wherein each of said wings having a barb to grip said stake hole pocket.

3. The bed rail cover of claim 1 further comprising an adhesive material disposed between said rail cover and said bed rail, whereby said rail cover being allowed to freely expand from said adhesive material about its longitudinal axis.

4. The bed rail cover of claim 3 wherein said adhesive material is disposed between said rail cover and said bed rail toward the longitudinal center of said rail cover.

5. The bed rail cover of claim 1 wherein said rail cover having a top surface and a bottom surface, said top surface having a plurality of elongated ridges.

6. The bed rail cover of claim 1 wherein a flexible gasket being disposed between said rail cover and said bed rail.

7. The bed rail cover of claim 1 wherein said upper wall having reinforcement rails extending below and therefrom, said reinforcement rails abutting said rail cover to center said fastening clip about said aperture.

8. A method of installing a bed rail cover for mounting to and protecting a vehicle bed rail having a stake hole pocket, said method comprising the steps of:

providing an integrally formed elongated thermoplastic rail cover having a top wall, two opposing side walls and an aperture substantially aligned with said stake hole pocket, said top wall and said side walls being shaped to substantially conform to the exterior of said bed rail, and a one piece fastening clip having an upper wall and two opposing wings extending therefrom, said rail cover being disposed between said fastening clip and said bed rail and said wings being yieldably biased against said stake hole pocket to secure said rail cover to said bed rail, a length of said wings along a longitudinal axis of said rail cover being sized smaller than a length of said stake hole pocket along a longitudinal axis of said rail cover, whereby said wings being allowed to slide against said stake hole pocket along the longitudinal axis of said rail cover and said rail cover being allowed to freely contract and expand about its longitudinal axis;

placing said rail cover around said bed rail;

inserting said fastening clip through said rail cover and into said stake hole pocket with said wings yieldably biased against said stake hole pocket to secure said rail cover to said rail bed.

9. The method of claim 8 further comprising the step of placing an adhesive material between said rail cover and said bed rail towards the longitudinal center of said rail cover.

* * * * *